United States Patent [19]

Daniel et al.

[11] Patent Number: 5,226,253
[45] Date of Patent: Jul. 13, 1993

[54] FISHING LURES WITH COATED WIRE SHAFTS

[76] Inventors: Nestoras Daniel, 41 Frankdale Avenue, Apt. 3; Dan Kotsopoulos, 41 Frankdale Avenue, Apt. 2, both of, Tornoto, Ontario, Canada, M4J 3Z8

[21] Appl. No.: 813,087

[22] Filed: Dec. 24, 1991

[30] Foreign Application Priority Data

Jan. 4, 1991 [CA] Canada ............... 2033603

[51] Int. Cl.⁵ .................................. A01K 85/00
[52] U.S. Cl. ........................... 43/42.19; 43/42.13
[58] Field of Search ............... 43/42.19, 42.13, 42.14, 43/42.17, 42.53

[56] References Cited

U.S. PATENT DOCUMENTS

| | | | |
|---|---|---|---|
| 1,533,022 | 4/1925 | Mead | 43/42.19 |
| 3,555,717 | 1/1971 | Gautsche, Jr. | 43/42.19 |
| 3,824,732 | 7/1974 | Boone | 43/42.05 |
| 3,891,488 | 6/1975 | White | 29/898.047 |
| 4,718,191 | 1/1988 | Gentry | 43/42.13 |
| 4,793,089 | 12/1988 | Long et al. | 43/42.13 |
| 4,962,610 | 10/1990 | Bleam et al. | 43/42.53 |
| 4,984,950 | 1/1991 | Streed | 43/42.13 |

*Primary Examiner*—Richard K. Seidel
*Assistant Examiner*—Chuck Y. Mah

[57] ABSTRACT

A spinner type lure having a wire shaft, upon which a spinning element and fish hooks are mounted, having the wire shaft part thereof coated with a low surface friction and low water wetting material such as those included in the group containing polytetrafluoroethylenes and hexafluoropropylenes. The coating provides improved spinner action and more animated movement of the lure in the water.

4 Claims, 1 Drawing Sheet

FISHING LURES WITH COATED WIRE SHAFTS

FIELD OF THE INVENTION

The present invention relates to spinner type fishing lures which come in several configurations having, in common, a shaft element and a spinner and hook arrangement. For instance, the shaft may be straight with a spinner mounted ahead of the hook or the shaft may be provided with two arms, branching out from the fishing line end, and upon one arm of which is mounted the spinner mechanism and on the other arm the hook arrangement. Such later type are know as buzzer and spinner baits.

BACKGROUND OF THE INVENTION

Spinner type lures come in many styles and configurations and are designed to show movement and light flashes, when drawn through the water, to attract fish thereto and improve the efficiency of the fisherman. In order to do so the lure must provide animated action in the water, show light flashing to excite the fish and also slide through the water and weeds with relative ease and, not least, be durable.

Spinner type lures, presently available in the market place, fall short of the ideal in that the action of the lure is not as animated as it might be in view of the drag of water thereon and the friction between the shaft of the lure and any spinner mounted thereon. Furthermore, the shafts are prone to pitting and rusting thus further deteriorating the lure action and appearance with the result that the lure is prematurely discarded.

DISCLOSURE OF THE INVENTION

The intent of the present invention is to overcome some of the drawbacks of known spinner type fishing lures and provide lures which are more animated in action, slide through weeds and water in an improved fashion and provide greater durability and useful life. More particulary the present invention is concerned with improvements of the appearance, the action and durability of the spinner type fishing lure and comprises the application of a low friction, non wetting coating, such as polytetrafluoroethylene and the like coatings, to the shaft per se of the fishing lure. Such coatings improve the appearance, provide less friction for the spinner which is mounted on the coated shaft, allow for easier movement through the water and weeds due to the slippery, non wetting, surface provided and furthermore, the coating protects against shaft rusting and pitting.

DETAILED DESCRIPTION OF THE INVENTION.

Figure 1:
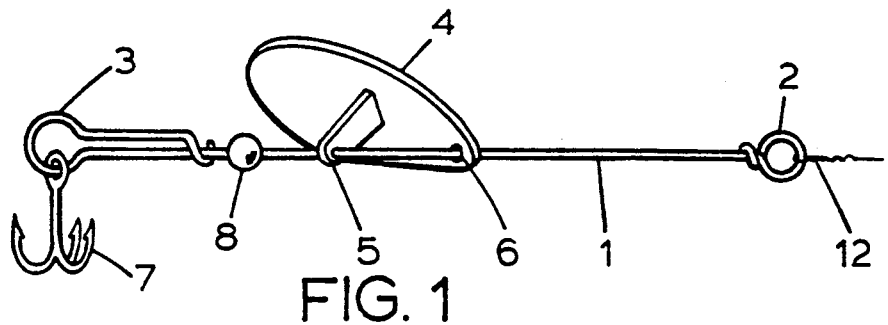
FIG. 1, shows a straight shafted fishing lure with a leaf type spinner.

Referring to the drawings, FIG. 1 shows a straight shafted spinner lure having a straight shaft 1 with a fishing line loop or eye 2 provided at on end thereof and a wire clip 3, formed at the other end of the shaft, which clip secures a hook 7 to the shaft 1. At this end of the shaft a light reflecting leaf-type spinner is mounted with a spacer bead 8. The spinner is mounted directly on the shaft which is coated with a polytetrafluoroethylene substance, for instance that known under the Trademark TEFLON, which coating acts as a low friction bearing material for the spinner. The coating further protects the shaft against rusting and pitting and, in addition, due to the non wetting surface provided thereby, allows the shaft to slip more readily through the water. This means that sideways movements are less restricted and with the faster spinning provided for by the low friction coating a better animated action occurs. Furthermore, it appears that the coating provides for better slippage of weeds thereby thus allowing for better action of the lure in weeded areas.

Figure 2:
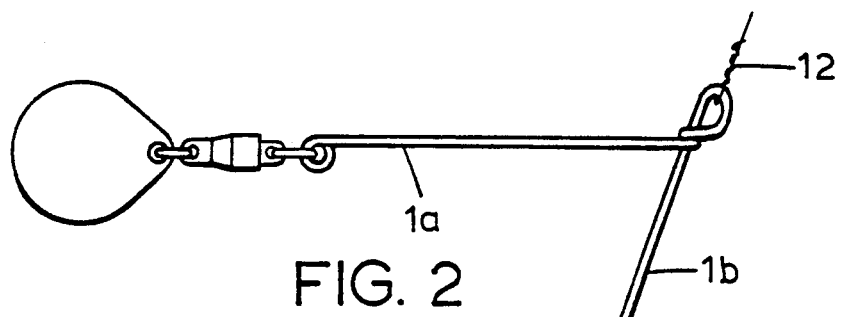
FIG. 2 shows a spinner bait suitable for catching fish such as bass and pickerel and, FIG. 3 shows a "buzzer" bait of the type used for catching muskellunge and pike.

FIG. 2 shows a spinner lure having a shaft provided with two arms 1a and 1b. The spinner is mounted on one arm, as shown, and due to the extra drag provided by the spinner, tends to more closely follow the path of the fishing line than does the other arm to which the fish hook 7 is attached, in this case, firmly by a lead bead which provides the necessary ballast for the lure for trolling etc. The bead is provided with thin strips of plastic or other filamentary material, such as that termed "living rubber", to provide a more life like appearance for the lure. In this case the total shaft is provided with the polytetrafluoroethylene coating.

Figure 3:
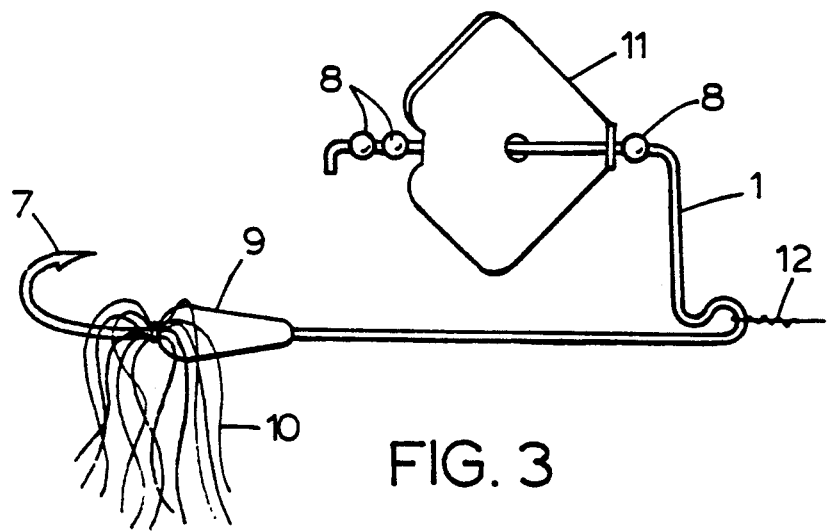

FIG. 3 shows a "buzzer" type spinner lure having a shaft which is provided with one straight trailing arm 1a and an offset and bent parallel further arm 1b. The spinner, in this instance, is a bladed propeller type, mounted on arm 1b, which provides a much more vigorous spinning action in order to ride closer to the surface of the water and attract the larger fish such as muskellunge. The shaft part of the lure is again provided with the coating according to the invention.

When the coating used on the lure shafts is dark, for instance black, the shaft itself is less visible and is less likely to frighten off a fish.

Variations of the invention which may occur to those skilled in the art and which do not depart from the spirit and scope of the invention, are intended to be covered by the claims appended hereto.

The embodiments of the invention in which an exclusive property or privileges is claimed are defined as follows:

1. In a spinner type fishing lure having a wire shaft on which is mounted a spinning element and a fish catching hook, the improvement wherein the wire shaft is provided with a complete covering coating of a substance which provides a low friction surface for reaction with the spinner element and, at the same time, a low water wetting surface to reduce the drag of the water through which it may be drawn to increase the animated action of the lure.

2. The lure, as claimed in claim 1, wherein the coating is selected from the group including polytetrafluoroethylene and hexafluoropropylene.

3. A fishing lure, of the spinner type, having a wire shaft with eye means to secure the shaft to a fishing line and at least one trailing arm provided with spinner and hook elements, wherein the wire shaft si completely coated with a low friction, low water wetting, coating to provide low spinning friction for the spinning element and, by virtue of the low water wetting, a low resistance to the off-axis movement of the shaft through water to allow greater animated movement of the lure in the water.

4. The fishing lure as claimed in claim 3, wherein the coating comprises a material selected from the group including polytetrafluoroethylene and hexafluoropropylene.

* * * * *